March 29, 1960 M. A. NOVAK 2,930,864
HYDRAULIC BRAKE LOCKING DEVICE
Filed June 9, 1959
FIG. 1.
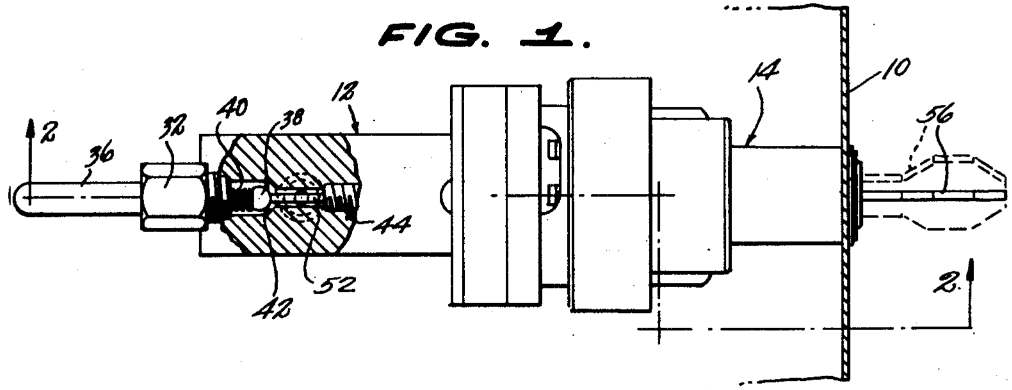
FIG. 2.
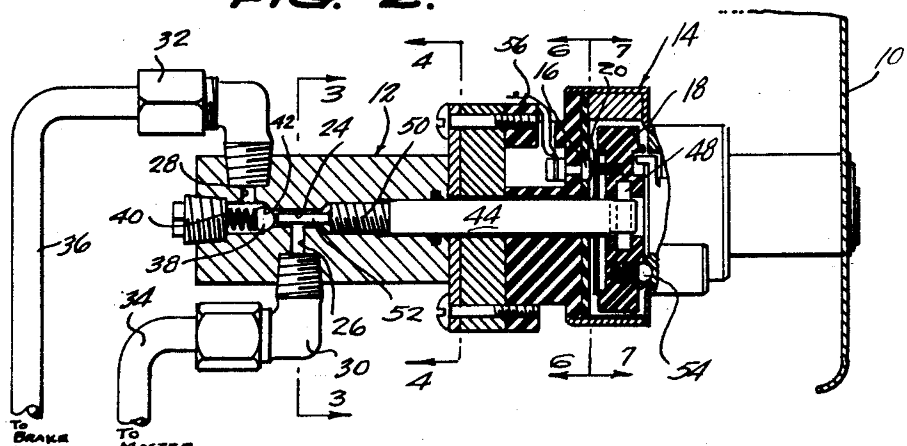
FIG. 3.
FIG. 4.
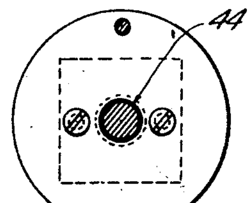
FIG. 6.
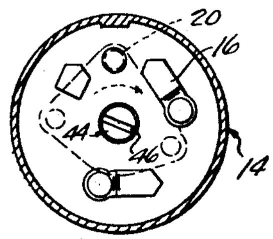
FIG. 7.
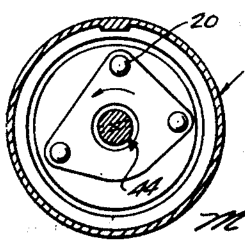
FIG. 5.
INVENTOR.
MATHEW A. NOVAK,
BY
McMorrow, Berman & Davidson
ATTORNEYS.

United States Patent Office 2,930,864

Patented Mar. 29, 1960

2,930,864

HYDRAULIC BRAKE LOCKING DEVICE

Mathew A. Novak, Cleveland, Ohio

Application June 9, 1959, Serial No. 819,120

5 Claims. (Cl. 200—61.86)

This invention relates to a device for automatically locking the hydraulic brakes of a vehicle when the ignition switch is turned to off position.

Previously proposed have been devices for securing the hydraulic brakes of a vehicle when the vehicle is parked and the ignition switch is turned off. Such devices have not been generally successful for various reasons. Some of the proposed devices are complicated in structure and impractical to install in a vehicle. Other of the devices proposed have been unsatisfactory for the reason that they require a manual operation to unlock or lock the device independently of the operation of the ignition switch.

An object of the present invention is to provide a hydraulic brake locking device which is automatic in operation with the actuation thereof dependent upon the turning of the ignition switch to locked or ignition-off position.

Another object of the present invention is to provide a hydraulic brake locking device which lends itself to installation in any automotive vehicle having hydraulic brakes.

A further object of the present invention is to provide a hydraulic brake locking device which requires no attention after being installed in an automotive vehicle, affords positive locking of the automobile against theft when the ignition key is turned to off-position, one which is simple in structure, one sturdy in construction and having few movable parts, and one which is highly effective in action.

These and other objects and advantages of the present invention will be fully apparent from the following description when taken in conjunction with the annexed drawing, in which:

Figure 1 is a top plan view of the device of the present invention, shown installed in an automotive vehicle dashboard, portions of the dashboard being broken away and a portion of the device broken away to show the valve element in open position, Figure 2 is a view taken on the line 2—2 of Figure 1, showing the valve element in closed position, portions of the lock being broken away to show the structure thereof, Figure 3 is a view taken on the line 3—3 of Figure 2, Figure 4 is a view taken on the line 4—4 of Figure 2, Figure 5 is an isometric view of the plunger employed in the device of the present invention, shown removed from the device, Figure 6 is a view taken on the line 6—6 of Figure 2, and Figure 7 is a view taken on the line 7—7 of Figure 2.

Referring in greater detail to the drawing in which like numerals indicate like parts throughout the several views, the reference numeral 10 designates the dashboard or panel of an automotive vehicle. Shown installed thereon is the hydraulic brake locking device in combination with an ignition switch, the device being designated generally by the numeral 12 and the switch by the numeral 14.

The switch 14 includes at least one fixed contact (Figures 6 and 7) designated by the numeral 16, and a barrel 18 carrying a cooperating contact 20, the barrel 18 being rotatable in one direction to shift the contact 20 into contacting engagement with the contact 16 and in the opposite direction to shift the contact 20 out of contacting engagement with the contact 16.

The device 12 includes a body 22 arranged in cooperating relation with respect to the switch 14 and having a first passage 24 and a second passage 26 on one side of and extending transversely from the first passage 24. The body 22 is provided with a third passage 28 on the other side of and extending transversely of the passage 24. The passages 26 and 28 have enlarged tapped outer portions each receiving the threaded end portion of a coupling member 30 and 32, respectively. A conduit 34 has one end connected to the coupling member 30 and its other end leading to the master cylinder of the brake system of the vehicle in which the device 12 is installed. Another conduit 36 has one end connected to the coupling member 32 and the other end leading to the brake cylinders of the vehicle.

The device 12 includes a spring biased valve element, in the form of a ball 38, in the part of the passage 24 between the passage 26 and the passage 28. The ball 38 is biased by a coil spring 40 into sealing engagement on a valve seat 42 provided in the passage 24.

Means is provided for shifting the valve element or ball 38 to open position with respect to the valve seat 42 responsive to rotary movement of the switch barrel 18 in one direction and permitting the valve element or ball 38 to return to closed position with respect to the valve seat 42 responsive to rotary movement of the barrel 18 in the other direction. Specifically, this means embodies a plunger 44 positioned within the passage 24 between the ball 38 and the switch barrel 18. The plunger 44 is connected to the barrel 18 for movement with the barrel 18.

The means connecting the plunger 44 to the barrel 18 consists in a slot 46 extending inwardly from one end of the plunger 44 and terminating at a point spaced inwardly from the one end of the plunger 44. The means also includes a bar element 48 arranged transversely of the barrel 18 and of a size to conformably fit within the slot 46 in the plunger 44.

A portion of the plunger 44 inwardly of and adjacent the end remote from the slot 46 is provided with threads, as at 50, threadedly engaged in threads provided on the inner wall of the passage 24 at a point adjacent to and spaced from the juncture point of the passage 26 with the passage 24. The portion of the plunger 44 outwardly of the threaded portion 50 is formed to the shape of a pin 52 of a size to fit loosely through the valve seat provided in the passage 24 so that upon rotation of the plunger 44 in one direction the pin 52 advances to engage the ball 38 and shift the latter out of the seating engagement on the valve seat 52 as shown in Figure 1. Upon rotation of the plunger 44 in the other direction the pin 52 retracts, as in Figure 2, permitting the spring 40 to force the ball 38 into seating engagement on the valve seat 42.

The switch 14 is of conventional construction with the exception that the bar element 48 has been added in order to impart rotation to the plunger 44. The switch 14 includes a suitable detent element, as at 54, for holding the switch in either the "ignition-on" position or the "ignition-off" position.

A key 56 (Figure 1) is provided for rotating the mechanism of the switch 14 in the conventional manner. Suitable connection means such as a wire 56 connects the contact 16 to the ignition system of the automotive vehicle in which the device along with the present invention is installed.

In operation, the device and switch 14 are attached to the dashboard or panel 10 in any suitable manner and the conduit 34 is connected in communication with the master cylinder of the vehicle. The conduit 36 is connected to the brake cylinders of the vehicle and upon insertion of the key 56 into the proper opening in the switch 14 and rotation of the key 56 from the full line position to the dotted line position, Figure 1, the movable contact 20 is brought into contact with the contact 16 so as to energize the ignition system of the vehicle. At the same time, the plunger 44 is rotated to lift the ball 38 from the valve seat 42 permitting flow of hydraulic fluid from the master cylinder to the brakes and from the brakes to the master cylinder as a result of the actuation of the brake pedals of the vehicle.

Upon locking of the automobile and parking the same, the key 56 is turned from the ignition-on position to the ignition-off position which retracts the plunger 44 a distance sufficient to relieve the engagement of the pin 52 from the ball 38 and permitting the same to rest upon the valve seat 42. Upon application of the brakes of the vehicle by depressing of the brake pedal of the same, fluid is forced through the conduit 34, through the passage 26, into the passage 24 and into the passage 28 and thence to the brake cylinders by way of the conduit 36. With the pin 52 out of engagement with the ball 38, the ball will seat upon the valve seat 42 and prevent flow of fluid from the conduit 36 to the conduit 34, while maintaining the brakes in their set position.

Upon insertion of the key 56 into the switch 14 and movement of the switch barrel 18 in the one direction, the plunger 44 will again move inwardly of the body 12 to engage the pin 52 with the ball 38 and to release the same from its engagement with the valve seat 42, permitting flow from the conduit 34 to the conduit 36 and in the reverse direction as controlled by the brake pedal mechanism of the hydraulic brake system of the vehicle.

What is claimed is:

1. In a hydraulic vehicle brake system, the combination with an ignition switch including a fixed contact, a barrel carrying a cooperating contact rotatable in one direction to shift the cooperating contact into contacting engagement with said fixed contact and in the opposite direction to shift the cooperating contact out of contacting engagement with said fixed contact, a body arranged in cooperating relation with respect to said switch and having a first passage, a second passage on one side of and extending transversely from said first passage, and a third passage on the other side of and extending transversely of said first passage, said second passage being adapted to be connected to the brake cylinders of said brake system and said third passage being adapted to be connected to the master cylinder of said brake system, and a spring biased valve element in the part of said first passage between said second and third passages and normally closing said first passage, of a means for shifting said valve element to open position responsive to rotary movement of said barrel in one direction and permitting said valve element to return to closed position responsive to rotary movement of said barrel in said other direction.

2. In a hydraulic vehicle brake system, the combination with an ignition switch including a fixed contact, a barrel carrying a cooperating contact rotatable in one direction to shift the cooperating contact into contacting engagement with said fixed contact and in the opposite direction to shift the cooperating contact out of contacting engagement with said fixed contact, a body arranged in cooperating relation with respect to said switch and having a first passage, a second passage on one side of and extending transversely from said first passage, and a third passage on the other side of and extending transversely of said first passage, said second passage being adapted to be connected to the brake cylinders of said brake system and said third passage being adapted to be connected to the master cylinder of said brake system, and a spring biased valve element in the part of said first passage between said second and third passages and normally closing said first passage, of a means for shifting said valve element to open position responsive to rotary movement of said barrel in one direction and permitting said valve element to return to closed position responsive to rotary movement of said barrel in said other direction, said means embodying a plunger positioned within said first passage between said valve and said switch and connected to said barrel for movement with the latter.

3. In a hydraulic vehicle brake system, the combination with an ignition switch including a fixed contact, a barrel carrying a cooperating contact rotatable in one direction to shift the cooperating contact into contacting engagement with said fixed contact and in the opposite direction to shift the cooperating contact out of contacting engagement with said fixed contact, a body arranged in cooperating relation with respect to said switch and having a first passage, a second passage on one side of and extending transversely from said first passage, and a third passage on the other side of and extending transversely of said first passage, said second passage being adapted to be connected to the brake cylinders of said brake system and said third passage being adapted to be connected to the master cylinder of said brake system, and a spring biased valve element in the part of said first passage between said second and third passages and normally closing said first passage, of a means for shifting said valve element to open position responsive to rotary movement of said barrel in one direction and permitting said valve element to return to closed position responsive to rotary movement of said barrel in said other direction, said mean including threads on a portion of the inner wall of said first passage between said valve and said switch, a plunger positioned within said first passage and having a portion provided with threads threadably engaged in the threaded portion of said first passage, and means connecting said plunger to said barrel for rotary movement therewith.

4. In a hydraulic vehicle brake system, the combination with an ignition switch including a fixed contact, a barrel carrying a cooperating contact rotatable in one direction to shift the cooperating contact into contacting engagement with said fixed contact and in the opposite direction to shift the cooperating contact out of contacting engagement with said fixed contact, a body arranged in cooperating relation with respect to said switch and having a first passage, a second passage on one side of and extending transversely from said first passage, and a third passage on the other side of and extending transversely of said first passage, said second passage being adapted to be connected to the brake cylinders of said brake system and said third passage being adapted to be connected to the master cylinder of said brake system, and a spring biased valve element in the part of said first passage between said second and third passages and normally closing said first passage, of a means for shifting said valve element to open position responsive to rotary movement of said barrel in one direction and permitting said valve element to return to closed position responsive to rotary movement of said barrel in said other direction, said means including threads on a portion of the inner wall of said first passage between said valve and said switch, a plunger positioned within said first passage and having a portion provided with threads threadably engaged in the threaded portion of said first passage, and means connecting said plunger to said barrel for rotary movement therewith, said last-mentioned means embodying a slot extending inwardly from one end of said plunger and a bar element arranged transversely of said barrel and carried by said barrel and slidably received in the slot in said plunger.

5. In a hydraulic vehicle brake system, the combination with an ignition switch including a fixed contact, a barrel carrying a cooperating contact rotatable in one direction to shift the cooperating contact into contacting engagement with said fixed contact and in the opposite direction to shift the cooperating contact out of contacting engagement with said fixed contact, a body arranged in cooperating relation with respect to said switch and having a first passage, a second passage on one side of and extending transversely from said first passage, and a third passage on the other side of and extending transversely of said first passage, said second passage being adapted to be connected to the brake cylinders of said brake system and said third passage being adapted to be connected to the master cylinder of said brake system, and a spring biased valve element in the part of said first passage between said second and third passages and normally closing said first passage, of a means for shifting said valve element to open position responsive to rotary movement of said barrel in one direction and permitting said valve element to return to closed position responsive to rotary movement of said barrel in said other direction, said means including threads on a portion of the inner wall of said first passage between said valve and said switch, a plunger positioned within said first passage and having a portion adjacent one end provided with threads threadably engaged in the threaded portion of said first passage, and means connecting said plunger to said barrel for rotary movement therewith, said last-mentioned means embodying a slot extending inwardly from the other end of said plunger and a bar element arranged transversely of said barrel and carried by said barrel and slidably received in the slot in said plunger.

References Cited in the file of this patent

UNITED STATES PATENTS

| | | |
|---|---|---|
| 1,230,108 | Burkhardt | June 19, 1917 |
| 2,399,033 | Hudson | Apr. 23, 1946 |
| 2,675,827 | Craddock | Apr. 20, 1954 |